United States Patent
Ali Khan et al.

(10) Patent No.: US 7,191,257 B2
(45) Date of Patent: Mar. 13, 2007

(54) SYSTEM AND METHOD FOR REAL-TIME PROCESSING OF NONDETERMINISTIC CAPTURED DATA EVENTS

(75) Inventors: Khasid M. Ali Khan, Austin, TX (US); Boris M. Bak, Austin, TX (US); Craig A. Aiken, Austin, TX (US); Tony Widjaja, Austin, TX (US)

(73) Assignee: National Instruments Corp., Austin, TX (US)

( * ) Notice: Subject to any disclaimer, the term of this patent is extended or adjusted under 35 U.S.C. 154(b) by 214 days.

(21) Appl. No.: 10/743,416

(22) Filed: Dec. 22, 2003

(65) Prior Publication Data

US 2005/0138234 A1    Jun. 23, 2005

(51) Int. Cl.
*G06F 13/14* (2006.01)
*G06F 3/00* (2006.01)
*G06F 12/02* (2006.01)

(52) U.S. Cl. .................. 710/22; 710/8; 710/9; 710/10; 710/51; 710/52; 710/53; 710/33; 714/39; 714/712; 714/763; 702/190

(58) Field of Classification Search .............. 710/8–10, 710/22, 52, 51, 53, 33; 714/712, 39, 763; 702/190
See application file for complete search history.

(56) References Cited

U.S. PATENT DOCUMENTS

| | | | | |
|---|---|---|---|---|
| 5,276,809 A | * | 1/1994 | Chisvin et al. | 710/18 |
| 5,282,213 A | * | 1/1994 | Leigh et al. | 714/724 |
| 5,457,694 A | * | 10/1995 | Smith | 714/712 |
| 5,649,129 A | * | 7/1997 | Kowert | 710/305 |
| 5,734,876 A | | 3/1998 | Kowert | |
| 5,737,520 A | * | 4/1998 | Gronlund et al. | 714/39 |
| 5,784,390 A | * | 7/1998 | Masiewicz et al. | 714/763 |
| 5,938,748 A | * | 8/1999 | Lynch et al. | 710/53 |

OTHER PUBLICATIONS

Hong et al., "Replay for Debugging MPI Parallel Programs", 0-8186-7533-0*96 IEEE 1996, (pp. 156-160).
Stasko et al., "A Methodology for Building Application-Specific Visualizations of Parallel Programs," Technical Report GIT-GVU-92-10, 1992, (22 pages).

* cited by examiner

*Primary Examiner*—Tammara Peyton
(74) *Attorney, Agent, or Firm*—Robert C. Kowert; Meyertons, Hoods, Kivlin, Kowert & Goetzel, P.C.

(57) ABSTRACT

A system and method for real-time processing of nondeterministic captured data events. The system includes data capture logic configured to capture data events from a nondeterministic data bus; a system memory including a plurality of addressable locations, where a subset of the plurality of addressable locations is configured as a data event buffer; a DMA transfer engine configured to transfer the captured data events from the data capture logic to a region of the data event buffer as portions of the captured data events become available from the data capture logic; and an application configured to retrieve captured data events from the data event buffer and to display the retrieved data events substantially in real time with respect to the occurrence of the corresponding captured data events on the nondeterministic data bus.

30 Claims, 5 Drawing Sheets

SYSTEM AND METHOD FOR REAL-TIME PROCESSING OF NONDETERMINISTIC CAPTURED DATA EVENTS

BACKGROUND OF THE INVENTION

1. Field of the Invention

This invention relates to computer systems, and more particularly, to processing of captured data events by computer systems.

2. Description of the Related Art

Conventional computer systems, in some embodiments, may be configured to support the collection of data from devices such as measurement devices. For example, in a laboratory or industrial process control environment, various measurement devices may be configured to collect data pertaining to various environmental variables. Measurement devices including sensors and transducers may be distributed throughout the measurement environment and configured to convey their observations to a computer system, which may collect and process received data as well as coordinate the configuration and operation of the various devices. A computer system configured to perform such tasks may also be referred to herein as a data capture system.

In some instances, measurement devices may be configured to convey their observations to the data capture system as those observations are made, which rate may depend entirely on the behavior of the measurement environment. In such instances, the rate of data flow from the measurement devices to the data capture system may vary dramatically over time, as the corresponding measured environmental variables change.

A data capture system may be configured to process data observations as they are received, and may attempt to do so with additional constraints such as a maximum limit on the time delay between receipt of a data observation and its processing. However, variability in the rate at which observations are made may complicate the processing task of the data capture system. The data capture system may incur processing overhead in the course of performing protocol operations to receive data observations, transporting those observations internally, and processing observations. High processing overhead, particularly when combined with a high rate of receipt of data observations, may result in delays in data processing or even data loss.

SUMMARY

Various embodiments of a system and method for real-time processing of nondeterministic captured data events are disclosed. In one embodiment, the system may include data capture logic configured to capture data events from a nondeterministic data bus and a system memory including a plurality of addressable locations, where a subset of the plurality of addressable locations is configured as a data event buffer. The system may also include a direct memory access (DMA) transfer engine coupled to the data capture logic and to the system memory, and which is configured to perform a DMA transfer operation of the captured data events from the data capture logic to a region of the data event buffer as portions of the captured data events become available from the data capture logic. The system may further include an application configured to retrieve captured data events from the data event buffer and to display the retrieved data events substantially in real time with respect to the occurrence of the corresponding captured data events on the nondeterministic data bus.

A method is also contemplated that, in one embodiment, may include capturing data events from a nondeterministic data bus, transferring the captured data events to a region of a data event buffer as portions of the captured data events become available, retrieving captured data events from the region of the data event buffer, and displaying the retrieved data events substantially in real time with respect to the occurrence of the corresponding captured data events on the nondeterministic data bus.

Figure 1:
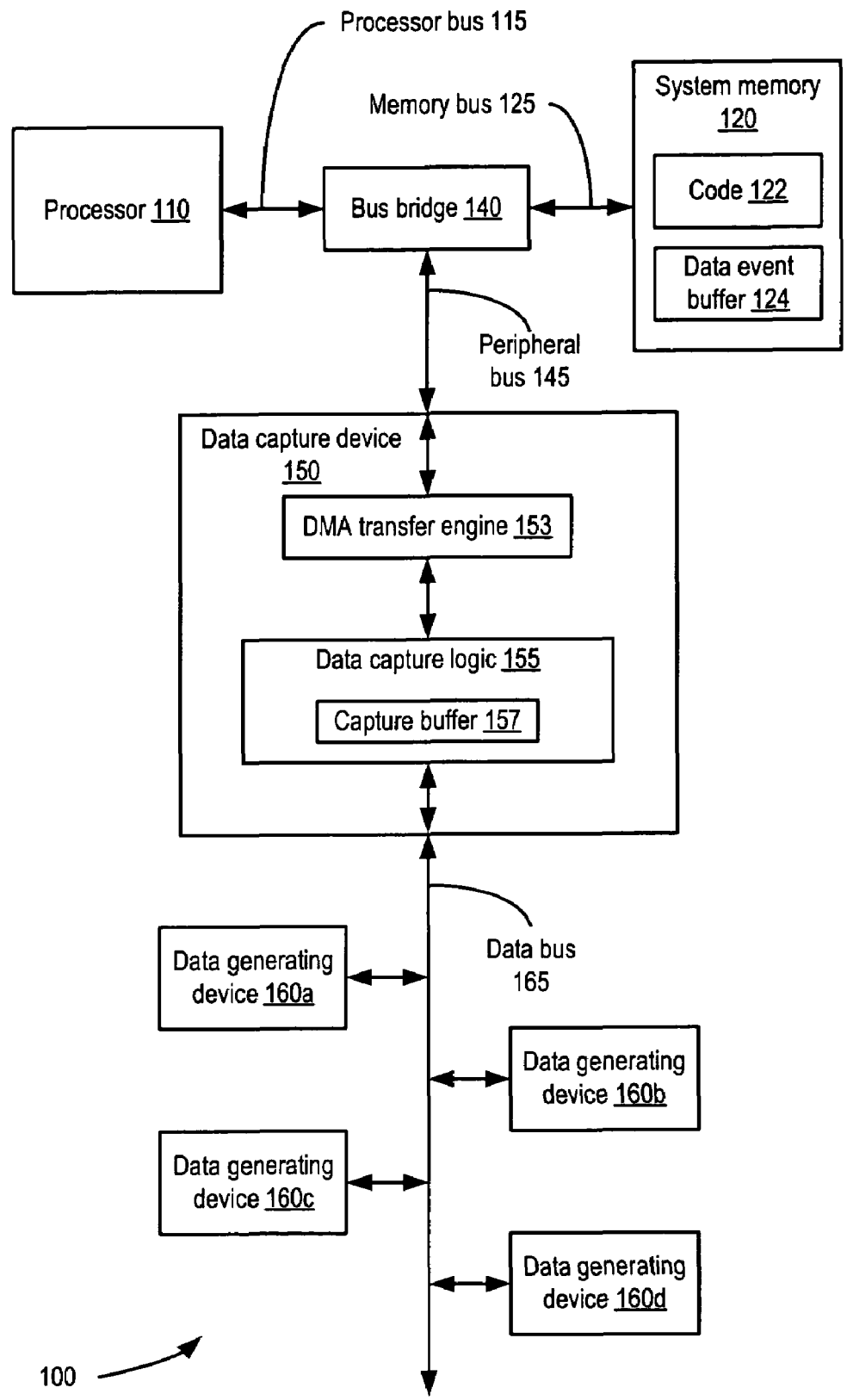
FIG. 1 is a block diagram illustrating one embodiment of a data capture hardware system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Embodiment of Data Capture System Hardware

Turning now to FIG. 1, a block diagram illustrating one embodiment of a data capture hardware system is shown. In the illustrated embodiment, data capture system 100 includes a processor 110 coupled to a bus bridge 140 via a processor bus 115. Bus bridge 140 is also coupled to a system memory 120 via a memory bus 125 as well as to a data capture device 150 via a peripheral bus 145. Data capture device 150 is in turn coupled to a plurality of data generating devices 160a–d via a data bus 165.

Processor 110 may be configured to execute instructions and process data stored in system memory 120. In one embodiment, processor 110 may be a microprocessor configured to implement the x86 instruction set architecture, while in other embodiments, processor 110 may implement other architectures. In some embodiments, processor 110 may include memory controller hardware and may be configured to couple directly to system memory 120 rather than through bus bridge 140.

System memory 120 may be configured to store program instructions and data used during operation of data capture system 100 within a plurality of addressable locations. In various embodiments, system memory 120 may include any of a variety of memory technologies such as static random access memory (SRAM) or dynamic RAM (DRAM), including variants such as dual data rate synchronous DRAM (DDR SDRAM) or error correcting code synchronous DRAM (ECC SDRAM). In some embodiments, system memory 120 may include a combination of these technologies as well as other technologies not specifically mentioned. In the illustrated embodiment, system memory 120 includes software code 122, which may include program instructions and data corresponding to one or more software modules such as those described further below in conjunction with the description of FIG. 2. System memory 120 further includes data event buffer 124, which also may be referred to herein as buffer 124, and which is also described in greater detail below.

System memory 120 may be one embodiment of a computer-accessible medium configured to store program instructions and/or data, such as those included in code 122 as just mentioned. However, in other embodiments, the program instructions and/or data included in code 122 may be received, sent or stored upon different types of computer-accessible media. Generally speaking, a computer-accessible medium may include storage media or memory media such as magnetic or optical media, e.g., disk or CD-ROM, which may be included in some embodiments of data capture system 100. A computer-accessible medium may also include volatile or non-volatile media such as the RAM technologies mentioned above, as well as ROM, "flash" nonvolatile RAM (NVRAM), etc., which may be included as part of or in addition to system memory 120. Further, a computer-accessible medium may include transmission media or signals such as electrical, electromagnetic, or digital signals, conveyed via a communication medium such as network and/or a wireless link, which may be included in some embodiments of data capture system 100, for example, as additional peripheral devices (not shown) coupled to bus bridge 140.

Bus bridge 140 may be configured to provide an interface between processor 110, system memory 120, and devices attached to peripheral bus 145. Specifically, when bus bridge 140 receives an operation such as a data transfer operation, for example, it may be configured to determine the destination of the operation and to route the operation to the appropriate destination device. Bus bridge 140 may also be configured to translate operations from the protocol of the source bus to the protocol of the destination bus. For example, in one embodiment peripheral bus 145 may implement the Peripheral Component Interconnect (PCI) bus standard, while memory bus 125 may implement a protocol specific to the type of memory included in system memory 120. In some embodiments, bus bridge 140 may be configured to support additional bus interfaces to additional devices, such as an Advanced Graphics Port (AGP) interface (not shown) or a level 2 (L2) or level 3 (L3) processor cache interface (not shown). In some embodiments, part or all of the functionality of bus bridge 140 may be incorporated into processor 110, while in other embodiments, multiple bus bridges may be used to implement a plurality of bus interfaces.

Data capture device 150 is coupled to bus bridge 140 via peripheral bus 145 in the illustrated embodiment. As noted above, in one embodiment peripheral bus 145 may implement the PCI bus standard. However, it is contemplated that peripheral bus 145 may implement any suitable standard for connecting peripheral devices. It is also contemplated that in some embodiments, data capture device 150 may connect to bus bridge 140 through a secondary bus bridge (not shown). For example, peripheral bus 145 may be coupled to a secondary bus bridge that implements a bus standard such as the Industry Standard Architecture (ISA) bus, the Personal Computer Memory Card International Association (PCM-CIA) bus, the Universal Serial Bus (USB), or any other suitable interconnect bus, which may in turn be coupled to data capture device 150.

In one embodiment, data bus 165 may be configured as a data acquisition bus conformant to a protocol such as the General Purpose Interface Bus (GPIB) standard (IEEE-488), for example. In other embodiments data bus 165 may implement a different protocol, for example a serial bus protocol such as the RS-232 bus. Other protocols to which data bus 165 may conform are possible and contemplated. In the illustrated embodiment, data bus 165 couples the plurality of data generating devices 160a–d to data capture device 150. For simplicity of reference, data generating devices 160a–d may be referred to individually herein as data generating device 160. It is noted that although four data generating devices 160a–d are shown, in other embodiments it is contemplated that any number of data generating devices 160 consistent with the implemented bus interface protocol may be coupled to data bus 165.

A given data generating device 160 may be configured to generate data events on data bus 165. In one embodiment, a data event may include the transmission of one or more data values on data bus 165, along with any necessary control information as specified by the protocol implemented by data bus 165. For example, a data generating device 160 may in one embodiment be a data measurement device configured to measure the value of an environmental variable such as voltage, temperature, pressure, or any other desired variable at a given point in time. Upon making a measurement, a data generating device 160 may be configured to convert the measurement value to a format appropriate for transfer on data bus 165, and may then generate a data event by transmitting the measurement value on data bus 165, including any necessary control protocol. For example, in one embodiment of data bus 165, data generating device 160 may assert a control signal indicating a readiness to send data and wait for an acknowledgement of readiness to receive data from a receiving device, such as data capture device 150, before transmitting a data value. In another embodiment, data generating device 160 may send data without a preliminary control indication and may wait for an acknowledgment of successfully data receipt, retransmitting the data if no acknowledgement is received after a period of time. Numerous other protocols governing the generation of data events on data bus 165 are possible and contemplated.

A data generating device 160 may be configured to generate data events at specified intervals or in response to a request for a data event. For example, a data generating device in one embodiment may be configured to take a measurement and generate a data event every 100 milliseconds. Additionally, data capture device 150 in one embodiment may be configured to request a data event from one or more data generating devices 160, for example in response to an internal timer elapsing or a data request from processor 110. In these embodiments, data events may be predictable in that they may occur at known times or in response to specific requests. In such cases, data bus 165 may be referred to as a deterministic data bus or as operating in a deterministic mode.

Alternatively, a data generating device 160 may be configured in some embodiments to generate data events at irregular intervals. For example, rather than generating data events at specified intervals, a data generating device 160 may be configured to generate a data event only in response to detecting a change in the data being collected. In such an embodiment, data events may be unpredictable in that they may occur in response to environmental changes external to data capture system 100. In this case, data bus 165 may be referred to as a nondeterministic data bus or as operating in a nondeterministic mode. It is noted that in a nondeterministic mode, data events may be separated by arbitrary periods of time. For example, no data events may be generated for a lengthy period of time, followed by numerous data events generated during a brief period of time.

Data capture device 150 may be configured to capture data events from data bus 165 and transfer captured data events to system memory 120 during either deterministic or nondeterministic operation of data bus 165. In the illustrated embodiment, data capture device 150 includes a direct memory access (DMA) transfer engine 153 coupled to peripheral bus 145 and to data capture logic 155, which is in turn coupled to data bus 165. Data capture logic 155 includes capture buffer 157.

Data capture logic 155 may be configured to capture data events from data bus 165 according to the implemented data bus protocol, as well as to store captured data events in capture buffer 157. In one embodiment, capture buffer 157 may be a first-in, first-out (FIFO) buffer including a plurality of entries and an indication of which entries include valid data at a given time. In such an embodiment, data events may be stored into and read from capture buffer 157 in the order that they are captured by data capture logic 155. In other embodiments, capture buffer 157 may be implemented using different buffer architectures, such as a random-access buffer, for example. As described in greater detail below in conjunction with the description of FIG. 2, in one embodiment data capture logic 155 may interact with a software application executable on processor 110 as code 122.

DMA transfer engine 153 may be configured to perform a DMA transfer of captured data events from data capture logic 155 to system memory 120. In one embodiment, DMA transfer engine 153 may be configured to transfer captured data events into buffer 124 as portions of captured data events become available from data capture logic 155. For example, DMA transfer engine 153 may be configured to transfer captured data events as soon as one or a programmable number of data events become valid in capture buffer 157. Further, in one embodiment DMA transfer engine 153 may be configured to become idle when no data events are valid in capture buffer 157. In such an embodiment, if DMA transfer engine 153 is idle and captured data events subsequently become valid in capture buffer 157, DMA transfer engine 153 may transfer the captured data events into buffer 124 without intervention on the part of another component of data capture system 100. In one embodiment, DMA transfer engine 153 may include logic configured to track the number of data events or quantity of bytes transferred to system memory 120 as well as the location of buffer 124 within system memory 120. As described in greater detail below in conjunction with the description of FIG. 2, in one embodiment DMA transfer engine 153 may interact with a software application executable on processor 110 as code 122.

Data Capture System Software Architecture

In one embodiment, the operation of data capture system 100 may be configured through the use of one or more software applications comprising instructions executable by processor 110. For example, such software applications may allow a user to specify various parameters regarding data event capture, such as the types of data events to be captured, the identities of data generating devices from which to capture data events, the frequency and/or mode (i.e., deterministic or nondeterministic) of data event capture, etc. Additionally, software applications may allow a user to process captured data events, such as by formatting data events for display, performing analytical functions on selected data events, or archiving captured data events, for example. Software applications may also configure and control the process of data event capture.

Figure 2:
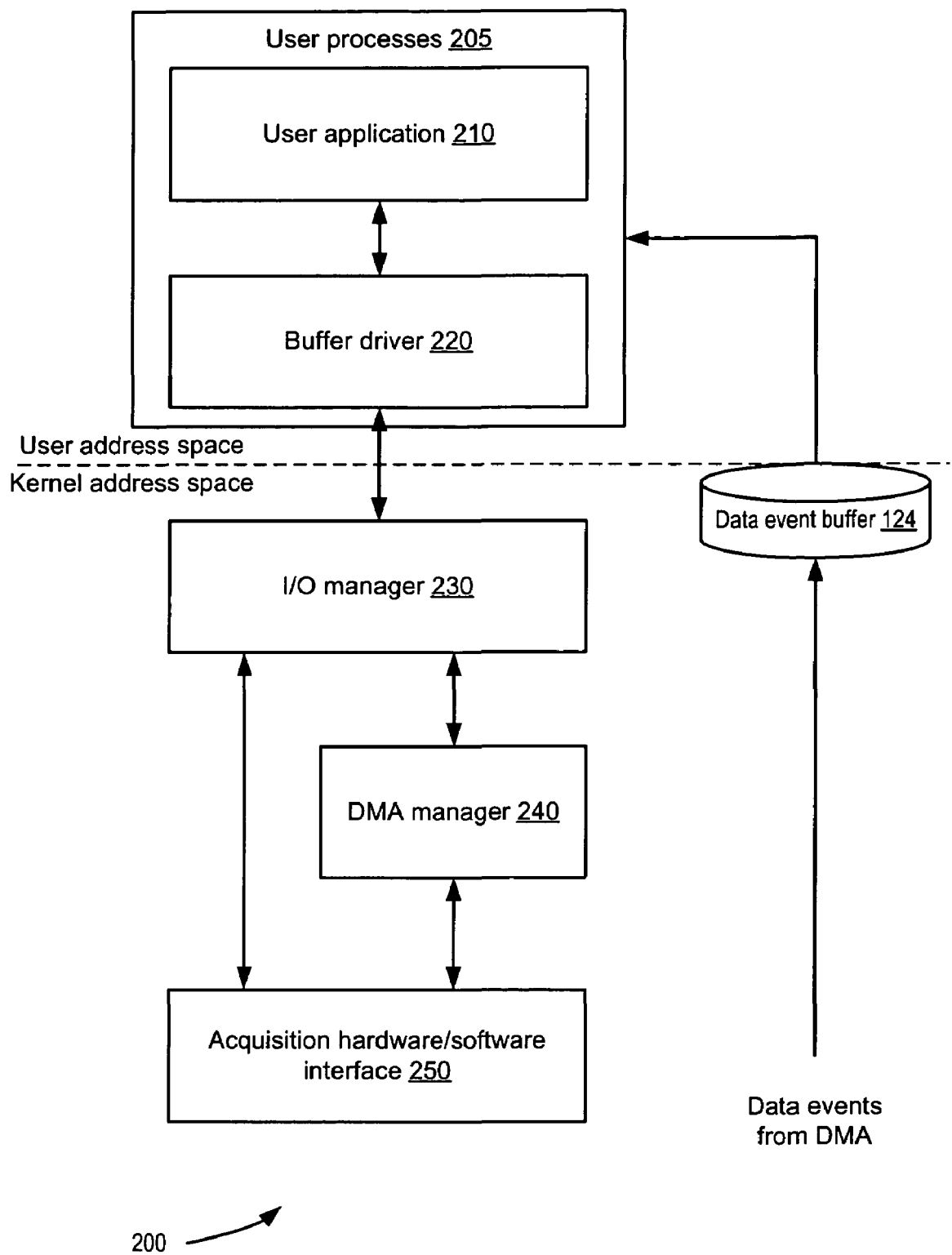
FIG. 2 is a block diagram illustrating one embodiment of a data capture software system.

FIG. 2 is a block diagram illustrating one embodiment of a data capture software system. In the illustrated embodiment, software system 200 includes user processes 205, which includes the software modules user application 210 and buffer driver 220. Software system 200 also includes the following software modules: input/output (I/O) manager 230, and DMA manager 240. Software system 200 further includes acquisition hardware/software interface 250 as well as buffer 124 of FIG. 1. Arrows interconnecting the software modules illustrated in FIG. 2 represent communication paths between the interconnected modules, through which data and control information may be passed.

Communication along the illustrated paths may be implemented using a variety of software techniques. For example, software function calls, such as may be defined in an application programming interface (API), may be used to implement communication between software modules in one embodiment. In another embodiment, software modules may communicate by passing messages, for example directly through a commonly-defined message passing port interface or indirectly through reading and writing shared memory. In still another embodiment, software modules may communicate over a network infrastructure using a protocol such as hypertext transfer protocol (HTTP), file transfer protocol (FTP), or transmission control protocol (TCP), for example. Exemplary embodiments of methods illustrating how the components of software system 200 may interact to perform various tasks are discussed in greater detail below in conjunction with the descriptions of FIG. 3 through FIG. 5.

In some embodiments, software system 200 may be configured to operate within an operating system environment that includes additional modules not illustrated in FIG. 2. In one embodiment, software system 200 may be configured to operate under a Microsoft Windows-compatible operating system, such as Windows 98 or another suitable version. In another embodiment, software system 200 may be configured to operate under a Unix-compatible operating system, such as Linux or another suitable Unix variant. In other embodiments, it is contemplated that software system 200 may be configured to operate under an embedded or real-time operating system, or to operate as a standalone software system without an operating system.

In the illustrated embodiment, software system 200 operates within an operating system environment that provides two distinct address spaces for applications, a user address space and a kernel address space. In one embodiment, applications executing within the user address space, such as user processes 205, may have fewer privileges than applications executing within the kernel address space. For example, user-space applications may be prohibited by the operating system from directly accessing kernel-space applications, data structures, or system resources. Restricting privileges of user-space applications in such a fashion may increase system stability and reliability by preventing malicious or errant user-space applications from corrupting critical system elements. Additionally, in some embodiments the user address space may be configured as a virtual address space, such that a given user address maps to a particular physical address that may or may not reside within physical system memory at a given time (i.e., the contents of a given physical address may be "swapped out", or resident on a storage medium other than system memory, such as disk storage). In such embodiments, kernel-space applications may be configured to control whether particular physical addresses are resident within physical system memory, swapping physically-addressed data into and out of physical system memory in response to the activity of user applications referencing the virtual address space.

User application 210, as one of user processes 205, may be configured to operate within the user address space (i.e., in "user mode"). In the illustrated embodiment, user application 210 is configured to access buffer 124 and process data events stored therein. For example, user application 210 may format data events retrieved from buffer 124 for display, and may provide a graphical user interface with which to display them. In one embodiment, user application 210 may be configured to display retrieved data events substantially in real time with respect to the occurrence of the data events on data bus 165 of FIG. 1. For example, software system 200 and data capture system 100 may be configured such that a data event occurring with a given minimum duration and maximum frequency is guaranteed to be displayed via user application 210 within a given maximum latency after the occurrence of the data event. Additionally, user application 210 may be configured to control the operation of data capture system 100. For example, user application 210 may be configured to specify parameters regarding data capture and to direct data capture system 100 to start or stop capturing data events.

As shown in the illustrated embodiment of software system 200, data events within buffer 124 are made available to user processes 205. In some embodiments, user application 210 may be configured to access buffer 124 directly, such as through pointers to buffer 124 provided by buffer driver 220, for example. In other embodiments, user application 210 may be configured to access buffer 124 indirectly. In some such embodiments, buffer driver 220 may be configured to access buffer 124 on behalf of user application 210, for example by copying data events from buffer 124 to a separate buffer (not shown) that is then made accessible to user application 210.

In the illustrated embodiment, buffer driver 220 may be configured to provide an interface between user application 210 and the portions of software system 200 configured to operate in the kernel address space (i.e., "kernel mode"). For example, in one embodiment buffer driver 220 may provide a common API including well-known function calls and parameters, such that various implementations of user application 210 may retrieve captured data events and configure the operation of software system 200 via a consistent mechanism. In response to a request from user application 210, buffer driver 220 may coordinate with I/O manager 230 to pass the request to another module of software system 200. For example, as described in greater detail below, user application 210 may issue a request to start data capture to buffer driver 220. Responsively, buffer driver 220 may issue one or more requests via I/O manager 230 to perform the tasks necessary to start data capture. Additionally, buffer driver 220 may coordinate with I/O manager 230 to convey indications originating from kernel-mode software modules to user application 210. For example, as described in greater detail below, if capture buffer 157 of FIG. 1 overflows, data capture device 150 may signal the overflow to I/O manager 230 via acquisition hardware/software interface 250. In this instance, buffer driver 220 may convey the overflow indication to user application 210.

I/O manager 230 is configured to operate in kernel mode in the illustrated embodiment, and as noted above, may further be configured to interface with the user-mode buffer driver 220 in response to requests or signals originating from user application 210 or data capture device 150. I/O manager 230 may include software code configured to control the data capture behavior of data capture device 150. For example, I/O manager 230 may include specific routines configured to start and stop data capture, and may interact directly with hardware/software interface 250 to convey commands originating from such routines to data capture logic 155 of data capture device 150. Additionally, in the illustrated embodiment, I/O manager 230 is configured to interface with DMA manager 240 to control the DMA behavior of data capture device 150. For example, I/O manager 230 may direct a request to DMA manager 240 to start or stop DMA transfer of captured data events, or to ascertain the number of data events transferred at a given point in time.

DMA manager 240 is also configured to operate in kernel mode in the illustrated embodiment, and may include software code configured to control the DMA behavior of data capture device 150. For example, DMA manager 240 may include routines configured to initialize, start, and stop DMA transfers, as well as to query data capture device 150 regarding the number of data events it has transferred to buffer 124 via DMA transfer operations. Like I/O manager 230, DMA manager 240 may interact directly with hardware/software interface 250 to convey commands originating from such routines to DMA transfer engine 153 of data capture device 150.

Acquisition hardware/software interface 250 is configured in the illustrated embodiment to provide software access to control and status hardware mechanisms of data capture device 150. For example, in one embodiment data capture device 150 may include one or more hardware registers configured to control various aspects of device operation, such as enabling or disabling data capture, as well as to report device status, such as DMA transfer count. In one embodiment, hardware/software interface 250 may be configured as a memory-mapped interface, such that the hardware registers are assigned specific physical addresses within the physical memory space of processor 110. In such an embodiment, software applications such as I/O manager 230 or DMA manager 240 may access a particular register via hardware/software interface 250 by performing a load or store operation to the corresponding physical memory address. In another embodiment, hardware/software interface 250 may map the hardware registers of data capture device 150 indirectly according to the protocol of peripheral bus 145 as implemented by bus bridge 140. For example, bus bridge 140 may implement memory-mapped bus control registers configured to select a particular device attached to peripheral bus 145 and a particular register within the selected device, as well as a memory-mapped data register configured to store data to be written to or read from the particular register of the selected device. In such an embodiment, software applications may access registers of data capture device 150 by performing the appropriate load and store operations of the bus control registers to initiate a bus transaction on peripheral bus 145. In various embodiments, numerous other configurations of hardware/software interface 250 are possible and contemplated.

As described above with respect to FIG. 1, during operation of data capture system 100, DMA transfer engine 153 may be configured in one embodiment to transfer captured data events from capture buffer 157 to buffer 124. This data event transfer path is illustrated in FIG. 2. The aforementioned modules of software system 200 may be configured to initialize data capture and DMA transfer of captured data events. In response to specific DMA transfer operations, captured data events may be stored within buffer 124. Subsequently, captured data events may be read out of buffer 124 by user application 210 for processing.

In the illustrated embodiment, buffer 124 is allocated within the kernel address space as a subset of the addressable locations of system memory 120. In some embodiments, allocating buffer 124 within the kernel address space may facilitate ensuring that the contents of buffer 124 reside in physical system memory, such that a DMA transfer operation into the buffer or a subsequent read operation from the buffer will not encounter a swapped-out buffer portion. For example, the corresponding physical memory addresses allocated to buffer 124 in the kernel address space may be marked by the operating system virtual memory system as non-swappable. By contrast, in embodiments where buffer 124 is allocated within the user address space, user application 210 may need to specifically request that a kernel mode application load buffer 124 into physical system memory and prevent it from swapping out during DMA transfer operations, which may incur significant additional processing overhead.

Buffer 124 may define a plurality of logical entries ordered by an associated buffer index. In some embodiments, the logical entries may directly correspond to addressable locations of system memory 120 and the buffer index may directly correspond to a memory address, while in other embodiments, the correspondence may be arbitrary. In some embodiments, buffer 124 may be configured to include a plurality of distinct regions of logical entries into which DMA transfer operations may occur. In such embodiments, DMA transfer engine 153 may be configured to continue a DMA transfer operation into a different region of buffer 124 in response to a given region of buffer 124 being filled.

For example, in one embodiment buffer 124 may be configured as a circular data event buffer having at least a region including the last logical entry of buffer 124 and a region including the first local entry of buffer 124. In such an embodiment, DMA transfer operations of captured data events into buffer 124 may cause logical entries to be written to in ascending order according to the buffer index. As entries are written into the region including the last logical entry of buffer 124, this region may fill with captured data events. Specifically, if the logical entries of buffer 124 are written to in ascending order, this region may fill when the last logical entry is written to. In this case, DMA transfer engine 153 may be configured to perform the next DMA transfer operation to the region including the first logical entry of buffer 124, without stopping the DMA operation or being reconfigured, such as by software, for example. Specifically, DMA transfer engine 153 may be configured to perform the next DMA transfer operation into the first logical entry of buffer 124. Thus, write operations into buffer 124 may be said to "wrap" from the last logical entry to the first logical entry in a circular fashion. In an alternative circular buffer embodiment, logical entries of buffer 124 may be written in descending order. In such an embodiment, writes may wrap from the first logical entry to the last. Reads of captured data events from buffer 124, for example by user application 210, may follow the same wrapping convention as writes.

In another embodiment, buffer 124 may be configured as a linear data event buffer that may include a plurality of linear regions. In such an embodiment, DMA transfer engine 153 may be configured to perform DMA transfer operations into a given region, for example in ascending order from the first logical entry in the region to the last logical entry in the region. If the logical entries of a given region of the linear buffer are written to in ascending order, this region may fill when the last logical entry is written to. In this case, DMA transfer engine 153 may be configured to perform the next DMA transfer operation to the first logical entry of a different region, without stopping the DMA operation or being reconfigured, such as by software, for example. In one embodiment, upon filling a given linear region of buffer 124, DMA transfer engine 153 may also cause a software module such as DMA manager 240 to be signaled, indicating that a region has been filled and is ready for processing. DMA manager 240 may then convey such an indication to buffer driver 220 and user application 210 via I/O manager 230, as described below in conjunction with the description of FIG. 4. In an alternative linear buffer embodiment, logical entries of a given region may be written in descending order, from the last logical entry of the region to the first. Reads of captured data events from a given region of buffer 124, for example by user application 210, may follow the same directional convention as writes.

Other architectures of buffer 124 including efficient continuation of DMA transfer operations in response to buffer-filling events are possible and contemplated. Further, as described in greater detail below in conjunction with the description of FIG. 4, by configuring DMA transfer engine 153 to perform DMA transfer operations of captured data events into buffer 124 without stopping and restarting such transfer operations while user application 210 reads and processes captured data events out of buffer 124, processing overhead of data capture system 100 may be reduced.

It is noted that in one embodiment, each of the software modules 210–250 of software system 200 may be implemented as program instructions and data corresponding to one or more instances of code 122, and which instructions are executable by processor 110 of FIG. 1. It is further noted that in alternative embodiments, the functionality of the software modules of software system 200 may be partitioned into different numbers and types of modules. For example, in one embodiment, the user and kernel mode functionality described above may be implemented in a single user and a single kernel software module, respectively, whereas in another embodiment, the described functionality may be partitioned into a greater number of modules than those shown.

Data Capture System Initialization

As noted above, in some embodiments data capture system 100 may be configured via software system 200 to perform data event capture. Once parameters specific to the desired mode of operation have been selected (for example, from which devices data events are to be captured, what mode of event capture is to be used, etc.), data capture system 100 and software system 200 may be configured to begin data event capture.

Figure 3:
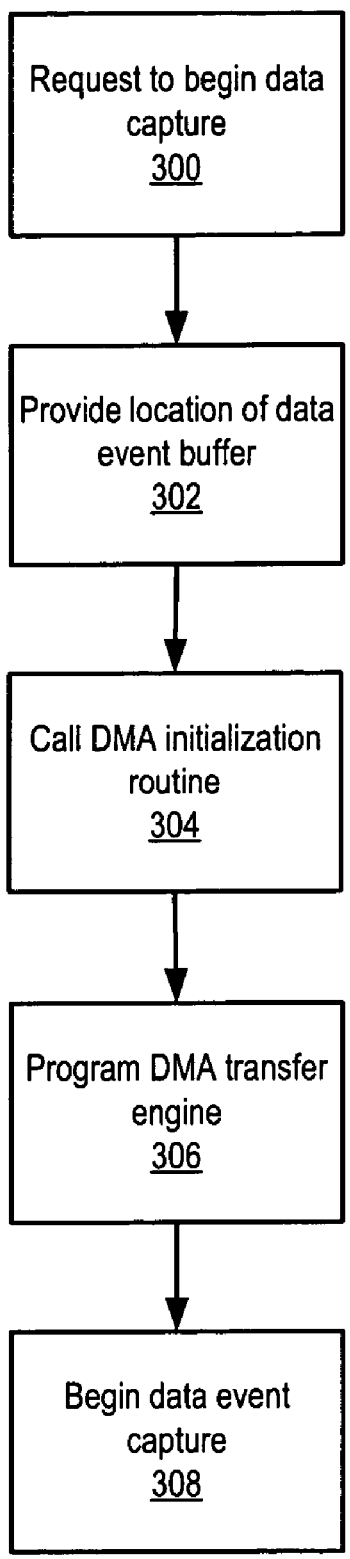
FIG. 3 is a flow diagram illustrating one embodiment of a method for initializing data event capture.

FIG. 3 illustrates one embodiment of a method for initializing data event capture. Referring collectively to FIG. 1 through FIG. 3, operation begins in block 300 where a request to begin data capture is made. In one embodiment, user application 210 may be configured to make such a request, for example in response to a user command. In such an embodiment, user application 210 may call a particular routine provided by the API of buffer driver 220. For example, such a routine may be called StartCapture( ), or any other desired name.

Subsequent to the request to begin data capture, the location of the data event buffer into which capture data events will be transferred may be provided to the requesting application (block 302). For example, in one embodiment buffer driver 220 may call a routine of I/O manager 230 requesting a pointer to data event buffer 124 on behalf of user application 210. In the illustrated embodiment, data event buffer 124 is allocated in the kernel address space. If data event buffer 124 is not actually allocated at the time buffer driver 220 requests a pointer to it, I/O manager 230 may responsively allocate data event buffer 124 in kernel address space. I/O manager 230 may then return the requested pointer to buffer driver 220, which may in turn return the pointer to user application 210. In some embodiments, I/O manager 230 may return additional information about data event buffer 124, such as its size in bytes, for example. In other embodiments, such as those employing object-oriented programming models, I/O manager 230 may return an object or data structure including data event buffer 124 rather than a pointer.

After information regarding the data event buffer has been provided to the requesting application, a DMA initialization routine may be called (block 304). For example, in the illustrated embodiment I/O manager 230 may call DMA manager 240. Subsequently, DMA manager 240 may execute code to program DMA transfer engine 153 via hardware/software interface 250 (block 306). For example, DMA manager 240 may program DMA transfer engine 153 with a memory address corresponding to the beginning of data event buffer 124, as well as its size. In some embodiments, DMA manager 240 may also program DMA transfer engine 153 to issue a signal after it has transferred a given number of captured data events, as described in greater detail below in conjunction with the description of FIG. 4.

Subsequent to programming of DMA transfer engine 153, data event capturing may begin (block 308). For example, in the illustrated embodiment, I/O manager 230 may execute code to program data capture logic 155 to begin capturing and storing data events within capture buffer 157.

It is contemplated that in some embodiments, the aforementioned steps may be performed in a different order than that illustrated, and that some steps may be performed in parallel rather than serially. For example, in one embodiment the DMA initialization of block 304 may proceed concurrently with the provision of the data event buffer location of block 302. Further, in one embodiment the data event capture initiation of block 308 may begin before DMA initialization of block 304 is completed.

Data Capture System Operation

Figure 4:
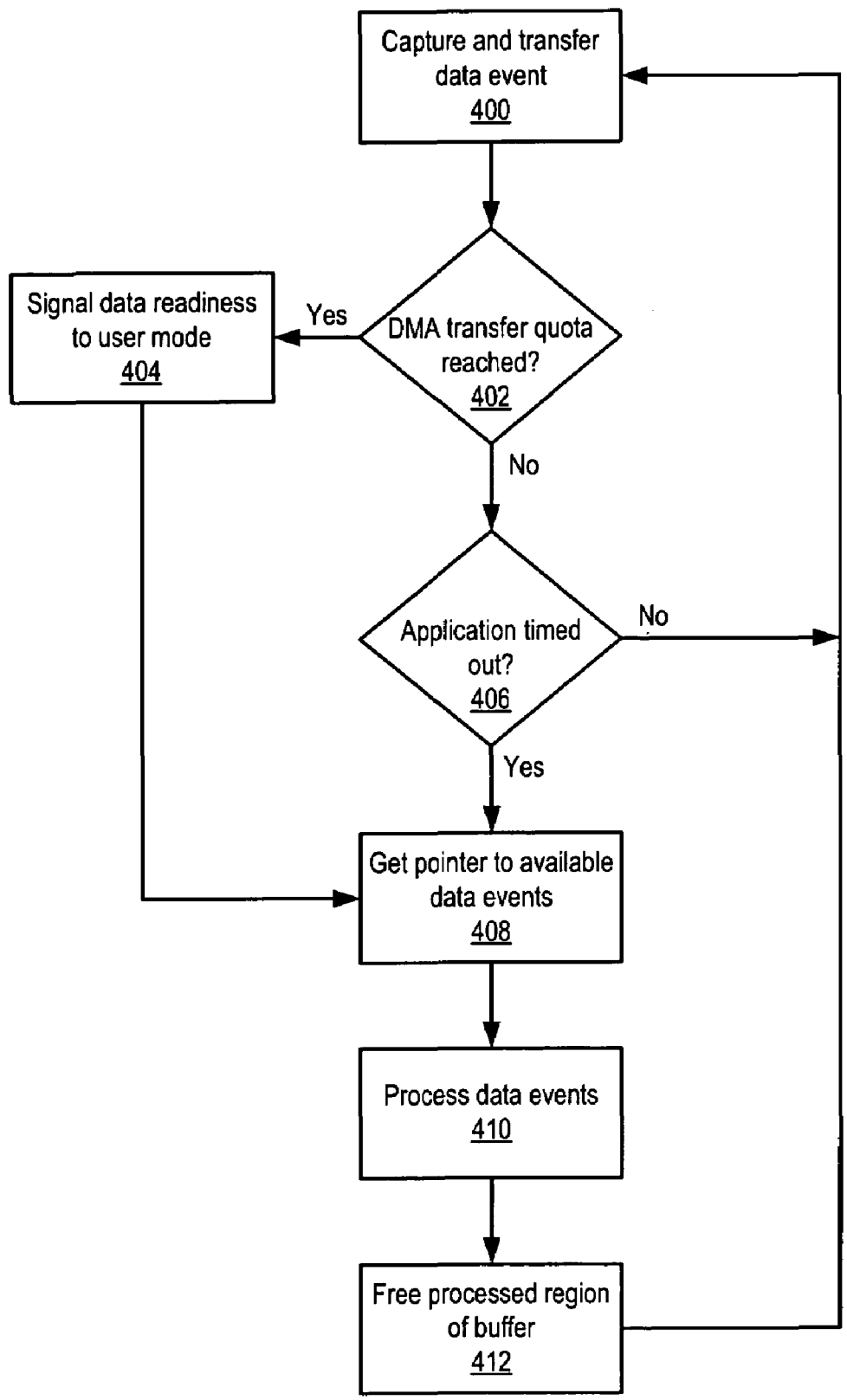
FIG. 4 is a flow diagram illustrating one embodiment of a method for transferring captured data events for processing by a software system.

Once data capture system 100 and software system 200 are initialized using the method illustrated in FIG. 3 or another method, data capture device 150 may capture data events that may be stored within capture buffer 157. FIG. 4 illustrates one embodiment of a method for transferring data events from capture buffer 157 to data event buffer 124 for processing by software system 200.

Referring collectively to FIG. 1, FIG. 2, and FIG. 4, operation begins in block 400 where a data event is captured and transferred via a DMA transfer operation to data event buffer 124. In the illustrated embodiment, data capture logic 155 may capture a data event occurring on data bus 165 and store the captured event in capture buffer 157. DMA transfer engine 153 may transfer captured data events from capture buffer 157 to data event buffer 124 as the captured data events become available, as described above.

DMA transfer engine 153 may also track the number of captured data events it transfers and may periodically or aperiodically compare the number of transfers or the number of data bytes transferred against a transfer quota (block 402). For example, during an initialization routine, DMA transfer engine 153 may be programmed with a transfer quota of four kilobytes of data. In an embodiment employing a buffer 124 including a plurality of linear regions as described above, the transfer quota may correspond to the size of the linear region being filled. After performing a DMA transfer operation in some embodiments, DMA transfer engine 153 may be configured to increment its count of bytes transferred and to compare that count against the transfer quota. If the quota has been exceeded, DMA transfer engine 153 may be configured to indicate to a user mode process that captured data events are ready for processing (block 404). For example, upon detecting that the quota has been exceeded, DMA transfer engine 153 may issue an interrupt that is serviced by DMA manager 240. DMA manager 240 may in turn convey the interrupt indication to I/O manager 230 and thence to buffer driver 220, which may then signal user application 210 that data events are ready for processing within data event buffer 124.

If DMA transfer engine 153 determines that the data transfer has not yet exceeded the transfer quota, processing proceeds to block 406, where software system 200 may be configured to determine whether a timeout period has elapsed. As described above, user application 210 may be configured in conjunction with the rest of software system 200 to display captured data events substantially in real time with their occurrence on data bus 165. Further, data bus 165 may be a nondeterministic data bus, such that the duration between captured events may be unpredictable, and in some cases may be substantial (such as hours or days, for example). If user application 210 were notified of data readiness only upon receiving an indication from DMA transfer engine 153 that a specific amount of data had been transferred to data event buffer 124, such notification might occur so infrequently that user application 210 could not process and display the captured data events substantially in real time with their occurrence on data bus 165.

Consequently, software system 200 may implement a timer to regularly check the status of captured data events in data event buffer 124. In some embodiments, user application 210 or buffer driver 220 may utilize a regular system timer interrupt to measure the passage of time, while in other embodiments, other techniques may be used to implement a timer, such as a dedicated programmable hardware timer, for example. The period of the timer may vary in different embodiments and according to the desired degree of real-time resolution of the system. For example, the timer may be configured such that it expires every one-half second. If the timeout period has not yet elapsed, operation may proceed to block 400 where more data events may be captured.

If either the timeout period has elapsed or a data readiness signal has been received, buffer driver 220 may be configured to request a pointer to the currently valid captured data events within data event buffer 124 (block 408). In the illustrated embodiment, buffer driver 220 may also be configured to request an indication of the number of valid captured data events within data event buffer 124, as if the pointer request is made in response to an elapsed timeout period, the number of valid captured data events may be arbitrary. For example, buffer driver 220 may call I/O manager 230, which may in turn call DMA manager 240. DMA manager 240 may query DMA transfer engine 153 to determine the number of transferred data events, and may return this data up the calling chain to buffer driver 220. In some embodiments, buffer driver 220 may then copy the valid captured data events from data event buffer 124 into a separate buffer allocated by user application 210 and then signal user application 210 of the availability of new data events for processing. In other embodiments, buffer driver 220 may transfer only information about the location and number of new data events to user application 210, which may then access data event buffer 124 directly. In either case, once notified of the availability and location of new captured data events, user application 210 may process those data events (block 410). For example, user application 210 may format captured data events for display and then cause them to be displayed, or may perform various analyses on the content of captured data events.

In some embodiments, processing of captured data events stored within data event buffer 124 may be considered to be complete once buffer driver 220 has copied the events to a separate buffer within user application 210. In other embodiments, processing may be considered to be complete when user application 210 has actually finished performing operations on the captured data events. Once processing of captured data events is complete, the corresponding logical entries of data event buffer 124 may be freed (block 412). In one embodiment, data capture device 150 may assign a sample index value to each captured data event, and DMA transfer engine 153 may maintain an indication of a selected sample index value which, if encountered during a DMA transfer operation of captured data events, may cause the DMA transfer operation to be paused to avoid overflowing data event buffer 124. In such an embodiment, buffer driver 220 may free entries of data event buffer 124 by determining how many entries are to be freed, computing how many additional data event samples the freed entries correspond to, and updating the sample index value used by DMA transfer engine 153 to pause transfers accordingly, such as by making calls to I/O manager 230 and DMA manager 240. Following freeing of entries of data event buffer 124, operation may continue from block 400 as described above.

It is noted that in some embodiments, DMA transfer operations of captured data events may continue during any of the method steps described above. For example, data events may be captured and transferred from capture buffer 157 to data event buffer 124 while timeout or transfer quota determination is being performed, or while user application 210 is processing previously captured data events from data event buffer 124. DMA transfer operations of captured data events may thereby interoperate with processing of previously transferred captured data events without DMA transfer engine 153 stopping and restarting such DMA transfer operations, thus decreasing the amount of processing overhead required to transfer and process captured data events. Further, it is noted that in some embodiments of data capture system 100, such as embodiments where system memory 120 is configured to sustain multiple substantially simultaneous read and write transactions to different memory locations, DMA transfer operations of captured data events into data event buffer 124 may operate substantially concurrently with processing of previously captured data events by user application 210.

In some embodiments, data events may occur on data bus 165 and be captured into capture buffer 157 at a rate faster than DMA transfer engine 153 can transfer the data events to data event buffer 124. Under such circumstances, capture buffer 157 may fill completely such that additional captured data events may either overwrite existing entries in capture buffer 157 or may be discarded. This situation may be referred to herein as overflow. In an overflow situation, captured data events may be lost until sufficient captured data events are transferred out of capture buffer 157 via DMA transfer engine 153 to restore capacity in capture buffer 157 for new data events.

Figure 5:
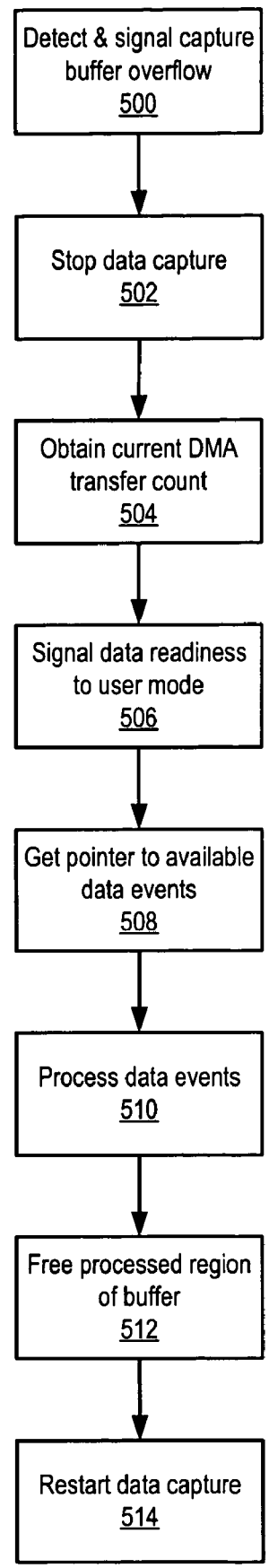
FIG. 5 is a flow diagram illustrating one embodiment of a method for processing an overflow of a capture buffer.

FIG. 5 illustrates one embodiment of a method for processing an overflow of capture buffer 157. Referring collectively to FIG. 1, FIG. 2, and FIG. 5, operation begins in block 500 where an overflow of capture buffer 157 is detected by data capture device 150 and the overflow is signaled to software system 200. For example, data capture device 150 may issue an interrupt that may be serviced by I/O manager 230.

In the course of responding to the overflow signal, I/O manager 230 may be configured to stop data event capture (block 502) without stopping DMA transfer operations conducted by DMA transfer engine 153. For example, I/O manager 230 may interact with control registers within data capture logic 155 via hardware/software interface 250 to stop data event capture. While data event capture is stopped, DMA transfer operations may continue, resulting in a net removal of captured data events from capture buffer 157.

After stopping data event capture, I/O manager 230 may obtain the number of transferred data events or bytes from DMA transfer engine via DMA manager 240 (block 504) in a manner similar to that during normal operation as described above. I/O manager 240 may also signal the readiness of data events to user application 210 via buffer driver 220 (block 506). In one embodiment, the signal may include an explicit indication that an overflow condition has occurred.

In response to receiving the indication of readiness of data events, buffer driver 220 may be configured to request a pointer to the currently valid captured data events within data event buffer 124 on behalf of user application 210 (block 508). This may occur in a manner similar to that during normal operation as described above, and as noted above, in some embodiments buffer driver 220 may copy captured data events from data event buffer 124 to a separate buffer allocated by user application 210, while in other embodiments buffer driver 220 may convey information about the location of data events within data event buffer 124 to user application 210. Subsequently, user application 210 may process the referenced captured data events (block 510). In one embodiment, user application 210 may explicitly indicate to a user that an overflow condition has occurred and that some data events may have been lost.

Once processing of captured data events is complete, the corresponding logical entries of data event buffer 124 may be freed (block 512). Determination of completion of processing may be made differently in different embodiments in a manner similar to that of normal operation as described above. Further, freeing of logical entries of data event buffer 124 may also occur in a manner similar to that used during normal operation as described above. In the illustrated embodiment, after processed logical entries of data event buffer 124 are freed, data event capture may be restarted (block 514). For example, buffer driver 220 may call I/O manager 230 in the course of freeing entries, as described above. Responsively, I/O manager 230 may interact with control registers within data capture logic 155 via hardware/software interface 250 to restart data event capture.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
data capture logic configured to capture data events from a nondeterministic data bus;
a system memory including a plurality of addressable locations, wherein a subset of said plurality of addressable locations is configured as a data event buffer;
a direct memory access (DMA) transfer engine coupled to said data capture logic and to said system memory and configured to perform a DMA transfer operation of said captured data events from said data capture logic to a region of said data event buffer as portions of said captured data events become available from said data capture logic; and
an application configured to retrieve captured data events from said region of said data event buffer without said DMA transfer operation of said captured data events from said data capture logic to said region being stopped, such that said application is configured to display said retrieved data events substantially in real time with respect to the occurrence of the corresponding captured data events on said nondeterministic data bus.

2. The system as recited in claim 1, wherein said data event buffer is configured as a circular data event buffer.

3. The system as recited in claim 1, wherein said data event buffer is configured as a linear data event buffer.

4. The system as recited in claim 1, wherein said DMA transfer engine is further configured to convey an indication of data readiness to said application after transferring a given number of said captured data events to said data event buffer.

5. The system as recited in claim 1, wherein said application is further configured to request an indication of data readiness after a given period of time has elapsed without receiving a signal indicative of data readiness.

6. The system as recited in claim 1, wherein in response to said region of said data event buffer being filled, said DMA transfer engine is further configured to perform said DMA transfer operation to a different region of said data event buffer without said DMA transfer operation being stopped.

7. The system as recited in claim 1, wherein said data event buffer is allocated within a kernel address space.

8. The system as recited in claim 1, wherein said nondeterministic data bus conforms to the IEEE-488 General Purpose Interface Bus (GPJB) standard.

9. The system as recited in claim 1, wherein said data capture logic is further configured to assign a respective sample index value to each of said captured data events, and wherein said DMA transfer engine is further configured to pause said DMA transfer operation in response to detecting that the respective sample index value corresponding to one of said captured data events matches a selected sample index value.

10. The system as recited in claim 1, wherein said data capture logic is further configured to store said captured data events in a capture buffer, wherein in response to detecting an overflow of said capture buffer, said data capture logic is further configured to stop capturing data events without said DMA transfer operation being stopped.

11. A method, comprising:
capturing data events from a nondetermimstic data bus, wherein said capturing comprises storing said data events in a capture buffer;
a DMA transfer engine performing a DMA transfer of said captured data events from said capture buffer to a region of a data event buffer as portions of said captured data events become available;
retrieving captured data events from said region of said data event buffer without stopping said DMA transfer of said captured data events from said capture buffer to said region; and
displaying said retrieved data events substantially in real time with respect to the occurrence of the corresponding captured data events on said nondeterministic data bus.

12. The method as recited in claim 11, wherein said data event buffer is configured as a circular data event buffer.

13. The method as recited in claim 11, wherein said data event buffer is configured as a linear data event buffer.

14. The method as recited in claim 11, further comprising conveying an indication of data readiness to an application after transferring a given number of said captured data events to said data event buffer.

15. The method as recited in claim 11, further comprising requesting an indication of data readiness of said captured data events in said data event buffer after a given period of time has elapsed without receiving a signal indicative of data readiness.

16. The method as recited in claim 11, further comprising:
detecting that said region of said data event buffer is full during said transferring; and
in response to said detecting that said region is full, transferring said captured data events to a different region of said data event buffer without stopping.

17. The method as recited in claim 11, wherein said data event buffer is allocated within a kernel address space.

18. The method as recited in claim 11, wherein said nondeterministic data bus conforms to the IEEE-488 General Purpose Interface Bus (GPIB) standard.

19. The method as recited in claim 11, further comprising:
assigning a respective sample index value to each of said captured data events prior to transferring each said captured data event;
prior to transferring a given captured data event, detecting that said respective sample index value corresponding to said given captured data event matches a selected sample index value; and
in response to detecting said match, pausing said transferring of said captured data events.

20. The method as recited in claim 11, further comprising:
storing said captured data events in a capture buffer prior to said transferring;
detecting an overflow of said capture buffer; and
in response to detecting said overflow, stopping said capturing of said data events without stopping said transferring of said captured data events.

21. A tangible, computer-accessible storage medium comprising program instructions, wherein said program instructions are computer-executable to:
enable data capture logic configured to capture data events from a nondeterministic data bus;
configure a direct memory access (DMA) transfer engine to perform a DMA transfer operation of said captured data events to a region of a data event buffer as portions of said captured data events become available;

retrieve captured data events from said region of said data event buffer without said DMA transfer operation of said captured data events to said region being stopped; and display said retrieved data events substantially in real time with respect to the occurrence of the corresponding captured data events on said nondeterministic data bus.

22. The computer-accessible medium as recited in claim 21, wherein said data event buffer is configured as a circular data event buffer.

23. The computer-accessible medium as recited in claim 21, wherein said data event buffer is configured as a linear data event buffer.

24. The computer-accessible medium as recited in claim 21, wherein said DMA transfer engine is further configured to convey an indication of data readiness to an application after transferring a given number of said captured data events to said data event buffer.

25. The computer-accessible medium as recited in claim 21, wherein said program instructions are further executable to request an indication of data readiness after a given period of time has elapsed without receiving a signal indicative of data readiness.

26. The computer-accessible medium as recited in claim 21, wherein in response to said region of said data event buffer being filled, said DMA transfer engine is further configured to perform said DMA transfer operation to a different region of said data event buffer without said DMA transfer operation being stopped.

27. The computer-accessible medium as recited in claim 21, wherein said data event buffer is allocated within a kernel address space.

28. The computer-accessible medium as recited in claim 21, wherein said nondeterministic data bus conforms to the IEEE-488 General Purpose Interface Bus (GPIB) standard.

29. The computer-accessible medium as recited in claim 21, wherein said data capture logic is further configured to assign a respective sample index value to each of said captured data events, and wherein said DMA transfer engine is further configured to pause said DMA transfer operation in response to detecting that the respective sample index value corresponding to one of said captured data events matches a selected sample index value.

30. The computer-accessible medium as recited in claim 21, wherein said data capture logic is further configured to store said captured data events in a capture buffer, wherein in response to detecting an overflow of said capture buffer, said data capture logic is further configured to stop capturing data events without said DMA transfer operation being stopped.

* * * * *